(12) United States Patent
Lise et al.

(10) Patent No.: US 8,137,423 B2
(45) Date of Patent: Mar. 20, 2012

(54) METHOD OF MAKING ABRASIVE ARTICLE

(75) Inventors: Jonathan M. Lise, Woodbury, MN (US);
Jean Le Normand, Versailles (FR);
Gerhard Lohmeier, Cologne (DE)

(73) Assignee: 3m Innovative Properties Company, St. Paul, MN (US)

( * ) Notice: Subject to any disclaimer, the term of this patent is extended or adjusted under 35 U.S.C. 154(b) by 898 days.

(21) Appl. No.: 11/573,460

(22) PCT Filed: Jul. 18, 2005

(86) PCT No.: PCT/US2005/025441
§ 371 (c)(1),
(2), (4) Date: Feb. 9, 2007

(87) PCT Pub. No.: WO2006/023178
PCT Pub. Date: Mar. 2, 2006

(65) Prior Publication Data
US 2009/0023366 A1   Jan. 22, 2009

(30) Foreign Application Priority Data

Aug. 20, 2004  (GB) .................................. 0418633.4

(51) Int. Cl.
*B24D 13/12* (2006.01)
*B24D 13/14* (2006.01)
(52) U.S. Cl. ............. 51/298; 51/293; 264/257; 264/258
(58) Field of Classification Search .................. 451/259; 264/257; 51/298
See application file for complete search history.

(56) References Cited

U.S. PATENT DOCUMENTS

| | | | |
|---|---|---|---|
| 1,209,831 | A | 12/1916 | Gardner |
| 1,910,444 | A | 5/1933 | Nicholson |
| 2,161,725 | A | 6/1939 | Smith |
| 2,752,634 | A | 7/1956 | Rengering |
| 2,958,693 | A | 11/1960 | Hoover et al. |

(Continued)

FOREIGN PATENT DOCUMENTS

DE   1 051 683   2/1959
(Continued)

OTHER PUBLICATIONS http://www.shop3m.com/61500068178.html?WT.mc_ev=clickthrough&WT.mc_id=3M-com-GoogleOneBox-61500068178, Scotch-Brite TM Clean and Strip Disc D1, 4 in x ½ in X ¼ in S XCS, (May 18, 2011).

(Continued)

*Primary Examiner* — Jerry Lorengo
*Assistant Examiner* — Jared Wood
(74) *Attorney, Agent, or Firm* — Daniel D. Biesterveld; Scott A. Baum

(57) ABSTRACT

A method of making an abrasive article comprising an abrasive disc (1) of non-woven fibres having a central shaft (3) and a hub (2) securing the shaft (3) to the abrasive disc (1). The method comprising forming the hub (3) by injecting molten thermoplastic material into the abrasive disc (1), and allowing the thermoplastic material to cool and solidify such that the shaft (3) is secured to the abrasive disc (1). The invention provides a simple, economical and effective method of securing a shaft to a disc.

11 Claims, 4 Drawing Sheets

U.S. PATENT DOCUMENTS

| | | | |
|---|---|---|---|
| 3,041,156 A | 6/1962 | Rowse | |
| 3,043,063 A | 7/1962 | Peterson | |
| 3,362,114 A * | 1/1968 | Hurst | 451/508 |
| 3,500,592 A * | 3/1970 | Harrist | 451/508 |
| 3,800,483 A | 4/1974 | Sherman | |
| 3,861,955 A | 1/1975 | Lemelson | |
| 3,991,526 A | 11/1976 | Frank | |
| 4,054,425 A | 10/1977 | Sherman | |
| 4,227,350 A | 10/1980 | Fitzer | |
| 4,311,489 A | 1/1982 | Kressner | |
| 4,314,827 A | 2/1982 | Leitheiser | |
| 4,437,271 A | 3/1984 | McAvoy | |
| 4,448,590 A | 5/1984 | Wray | |
| 4,623,364 A | 11/1986 | Cottringer | |
| 4,652,275 A | 3/1987 | Bloecher | |
| 4,744,802 A | 5/1988 | Schwabel | |
| 4,770,671 A | 9/1988 | Monroe | |
| 4,799,939 A | 1/1989 | Bloecher | |
| 4,881,951 A | 11/1989 | Wood | |
| 4,951,341 A | 8/1990 | Shears | |
| 5,009,675 A | 4/1991 | Kunz | |
| 5,011,508 A | 4/1991 | Wald | |
| 5,042,991 A | 8/1991 | Kunz | |
| 5,090,968 A | 2/1992 | Pellow | |
| 5,201,916 A | 4/1993 | Berg | |
| 5,209,760 A | 5/1993 | Wiand | |
| 5,213,591 A | 5/1993 | Celikkaya | |
| 5,232,470 A | 8/1993 | Wiand | |
| 5,273,558 A | 12/1993 | Nelson | |
| 5,443,906 A | 8/1995 | Pihl | |
| 5,549,962 A | 8/1996 | Holmes | |
| 5,560,070 A | 10/1996 | Reaume | |
| 5,573,844 A | 11/1996 | Donovan | |
| 5,593,467 A | 1/1997 | Monroe | |
| 5,607,488 A | 3/1997 | Wiand | |
| 5,632,790 A | 5/1997 | Wiand | |
| 5,645,618 A | 7/1997 | Monroe | |
| 5,651,801 A | 7/1997 | Monroe | |
| 5,671,511 A | 9/1997 | Hattori et al. | |
| 5,736,081 A | 4/1998 | Yamakawa | |
| 5,849,646 A | 12/1998 | Stout | |
| 5,876,470 A | 3/1999 | Abrahamson | |
| 5,928,070 A | 7/1999 | Lux | |
| 5,975,988 A | 11/1999 | Christianson | |
| 5,996,167 A | 12/1999 | Close | |
| 6,001,202 A * | 12/1999 | Penttila et al. | 156/73.5 |
| 6,004,363 A | 12/1999 | Pisacane | |
| 6,179,887 B1 | 1/2001 | Barber | |
| 6,261,156 B1 | 7/2001 | Johnson | |
| 6,302,930 B1 | 10/2001 | Lux | |
| 6,521,004 B1 | 3/2003 | Culler | |
| 6,620,214 B2 | 9/2003 | McArdle | |
| 6,638,144 B2 | 10/2003 | Sventek | |
| 6,679,758 B2 | 1/2004 | Bright | |
| 6,811,582 B1 | 11/2004 | Wurzer | |
| 6,863,596 B2 | 3/2005 | Fritz | |
| 2001/0011108 A1 | 8/2001 | Thurber | |
| 2002/0019199 A1 | 2/2002 | Goers | |
| 2002/0095871 A1 | 7/2002 | McArdle | |
| 2002/0177387 A1* | 11/2002 | Keipert et al. | 451/28 |
| 2003/0113509 A1 | 6/2003 | Lugg | |
| 2005/0233678 A1* | 10/2005 | Fritz et al. | 451/28 |
| 2009/0023366 A1 | 1/2009 | Lise | |
| 2010/0190420 A1 | 7/2010 | Yamahara | |

FOREIGN PATENT DOCUMENTS

| | | |
|---|---|---|
| DE | 3301210 C2 | 3/1987 |
| DE | 195 01 201 | 7/1996 |
| DE | 199 51 250 | 5/2001 |
| DE | 102 10 673 | 9/2003 |
| EP | 0 451 944 | 10/1991 |
| EP | 0 554 806 | 8/1993 |
| EP | 0 790 880 B1 | 2/2000 |
| EP | 1 010 495 | 6/2000 |
| EP | 1 018 404 | 7/2000 |
| EP | 0 551 714 | 1/2002 |
| EP | 1 666 230 | 6/2006 |
| FR | 1 178 553 | 5/1959 |
| FR | 2 388 538 | 12/1978 |
| FR | 2 776 553 | 10/1999 |
| GB | 491 658 | 9/1938 |
| GB | 790 003 | 1/1958 |
| GB | 790003 * | 1/1958 |
| GB | 1 420 295 | 1/1976 |
| GB | 2 247 201 | 2/1992 |
| GB | 2 304 071 | 3/1997 |
| GB | 2 382 023 | 5/2003 |
| JP | 58-171263 | 10/1983 |
| JP | 05-229071 | 9/1993 |
| JP | 08-072171 | 3/1996 |
| JP | 08-140913 | 6/1996 |
| JP | 2000-006036 | 6/1998 |
| JP | 11-320423 | 11/1999 |
| JP | 11320423 A * | 11/1999 |
| JP | 2001-025957 | 1/2001 |
| KR | 10-1994-0023417 | 11/1994 |
| KR | 10-2002-0095941 | 12/2002 |
| KR | 2003-28233 | 4/2003 |
| WO | WO96/33638 | 10/1996 |
| WO | WO98/23411 | 6/1998 |
| WO | WO02/32832 | 4/2002 |
| WO | WO02/33019 | 4/2002 |
| WO | WO02/33030 | 4/2002 |
| WO | WO02/094506 | 11/2002 |
| WO | WO2005/115716 | 12/2005 |
| WO | WO2006/023178 | 3/2006 |

OTHER PUBLICATIONS

3M "Radial Bristle Discs" XP002608845 (1999) URL:http://multimedia.3m.com./mws/mediawebserver?mswId=66666UuZjcFSLXTt1XMX1XMcEVuQEcuZgVs6EVs6E666666—[retreieved on Nov. 10, 2010] XP002608845.

"Handbook of Chemistry and Physics", p. F-22 (1975).

Lafferty, "The Dictionary of Science", p. 386 (1993).

Rees, "Ionomeric Thermoplastic Elastomers Early Research—Surlyn and Related Polymers", Thermoplastic Elastomers. A Comprehensive Review, edited by N.R. Legge, G. Holden and H.E. Schroeder, Hanser Publishers, New York, pp. 232-243 (1987).

Colleselli, et a; "Schleifscheiben Und Schleifkoerper" Duroplaste, Kunststoff Handbuch, Munchen, Hanser Verlang, De. pp. 894, 896/897, 901, vol. 10 XP000645208 (1988).

* cited by examiner

METHOD OF MAKING ABRASIVE ARTICLE

FIELD OF THE INVENTION

This invention relates to a method of making an abrasive article and in particular to a method of making an abrasive article comprising an abrasive disc of non-woven fibres having a central shaft and a hub securing the shaft to the abrasive disc.

BACKGROUND

Abrasive discs for polishing and abrading applications are known. Generally such discs are releasably attached to a rotatable chuck, backup pad or shaft of a machine. There are a variety of means for attaching abrasive discs to a machine. Polishing discs and abrasive discs for light abrading applications may be releasably secured to a back-up pad e.g. by pressure sensitive adhesive, hook and loop fastener etc., and the back-up pad attached to the machine by a central boss or spindle. Another means of attachment comprises providing the disc with a central hub or boss. The hub may have an internal thread for engagement with a threaded shaft mounted on the machine. Alternatively the hub may have a central aperture through which a thread shaft mounted on the machine is inserted and secured by a nut. A further means of attachment comprises providing a disc with a central shaft which may be engaged by a rotatable chuck mounted on the machine.

JP 11320423A discloses a method of making a polishing disc in which a disc of non-woven fibres having a central aperture is placed in a mould and a boss having a central through aperture is formed by injection moulding a thermoplastic material. The molten thermoplastic material penetrates between the non-woven fibres to secure the boss to the disc. The boss may be provided with an interior thread formed on the perimeter surface of the central aperture to facilitate attachment to a machine.

Abrasive articles comprising a disc of non-woven fibres having a central metal shaft are commercially available from 3M Company of St. Paul, Minn., USA under the trade name CLEAN 'N STRIP Abrasive Disc. The abrasive articles are formed by inserting one end of a metal shaft into a central aperture in the disc, applying a circular paper label having a central aperture around the shaft and contacting one major surface of the disc, injecting curable epoxy resin from a plurality of nozzles into the central region of the web from the opposite side to the label such that the epoxy resin surrounds the end of the shaft and penetrates between the fibres of the disc. The epoxy resin is cured to secure the shaft. The paper plastic label acts as a barrier to the epoxy resin to prevent it flowing out of the disc. The shaft has a knurled end to facilitate secure bonding. While this method of securing the shaft to the disc is effective, the two part epoxy resin system is expensive and the production time is undesirably long.

SUMMARY

The invention has been made with the above points in mind.

According to the present invention there is provided a method of making an abrasive article comprising an abrasive disc formed of non-woven fibres, a shaft positioned at the centre of the abrasive disc and a hub securing an end of the shaft to the abrasive disc, the method comprising forming the hub by injecting molten thermoplastic material into the abrasive disc, and allowing the thermoplastic material to cool and solidify such that the shaft is secured to the abrasive disc.

The invention provides a simple, economical and effective method of securing a shaft to a disc. The molten thermoplastic material penetrates interstices between the fibres of the disc ensuring the hub is securely attached to the disc. The thermoplastic material encapsulates the end of the shaft providing firm mechanical attachment and/or bonding.

The abrasive discs used in the invention comprise non-woven fibres and are generally made from a uniform lofty web of continuous three-dimensionally autogenously bonded filaments. The web may be impregnated with an adhesive binder and may contain a multitude of abrasive grains or granules dispersed throughout the web. The thickness, length and composition of the filaments and the type of adhesive binder and abrasive particles may be selected depending upon the intended application of the abrasive article. Abrasive discs may be prepared suitable for a wide variety of applications including polishing, removal of mill scale from steel coil stock, blending of weld lines, preparing surfaces for painting or other coating operations, removal of various surface coatings in repair and maintenance operations etc. Suitable webs from which the abrasive discs are cut are known and disclosed, for example, in U.S. Pat. Nos. 2,958,593, 4,227,350, 5,928,070 and 6,302,930. The abrasive disc may be identical to the discs commercially available from 3M Company under the trade name CLEAN 'N STRIP Abrasive Disc. The abrasive disc may have foam injected into the web as used in the product commercially available from 3M Company under the trade name 3M ROLOC HI-PERFORMANCE CLEAN 'N STRIP Abrasive Disc H1-DC.

Generally the shaft used in the invention is a metal shaft e.g. steel. The end of the shaft positioned within the disc is preferably roughened or knurled. The end may be plated e.g. nickel plated and/or coated with a primer and/or adhesive to facilitate bonding with the thermoplastic material used to form the hub.

The abrasive disc may be cut or drilled to provide an aperture within which the end of the shaft is positioned. The aperture is conveniently circular but may have other shapes provided they do not upset the balance of the abrasive disc during rotation. The use of an aperture allows the thermoplastic material to completely surround the shaft and penetrate into the fibres of the disc adjacent the aperture. However, it is not essential to provide an aperture and the end of the shaft may be forced into the centre of the abrasive disc to penetrate the fibres. In this case fibres of the abrasive disc will touch the shaft and the thermoplastic material fills the interstices between the fibres adjacent the shaft.

The end of the shaft may project partly into the disc and preferably extends substantially completely through the thickness of the disc. The shaft may pass through the. disc with the end projecting beyond the surface of the disc, particularly where the hub projects above the surface of the disc.

The thermoplastic material forming the hub may extend beyond one or both surfaces of the disc for additional strength. However, this is not essential and the thermoplastic material may be level or below the surface(s) of the disc.

The abrasive article may conveniently be made in a mould comprising a first mould plate and a second mould plate which form a mould cavity to accommodate the abrasive disc and form the hub. One of the mould plates comprises a bore into which the shaft is positioned so that one end projects into the mould cavity. The abrasive disc is positioned in the mould cavity so that the end of the shaft projects into the centre of the disc. One of the mould plates comprises a channel for injection of the molten thermoplastic material. Preferably the channel is positioned opposite the end of the shaft. Preferably the channel opens into a central recess in the moulding surface positioned above the end of the shaft since this provides an area for pressure concentration of the molten thermoplastic material during the injection moulding and prevents unwanted spread of the molten thermoplastic material.

When the abrasive disc has a central aperture it may simply be placed in the mould such that the aperture accommodates the end of the shaft. However, such an aperture is not essential and the disc may be placed in the mould and the action of closing the mould may cause the end of the shaft to penetrate the abrasive disc.

A wide range of thermoplastic materials may be used. The material is selected so that it will have a suitable viscosity at the injection temperature, generally 200 to 280° C., to penetrate between the fibres of the abrasive disc. It is preferred that the thermoplastic material contracts slightly when cooled from its molten state since this improves mechanical interlock with the end of the shaft. Exemplary thermoplastic materials include thermoplastic polyether ester elastomer block copolymers comprising hard (crystalline) segments of polybutylene terephthalate and soft (amorphous) segments based on long-chain polymether glycols commercially available from DuPont under the trade name HYTREL; polyamides, such as nylon 66 e.g. commercially available from LATI Industria Termoplastic S.p.A. under the trade name LATAMID and polyolefins, such as polyethylene and polypropylene. The thermoplastic material may optionally contain filler and/or reinforcing fibres.

Suitable injection moulding machines for use in the invention are well known and may have vertical or horizontal moulding orientations. A vertical orientation moulding machine provides one advantage since it facilitates positioning of the shaft and controlling the spread of the molten thermoplastic material forming the hub. Suitable injection moulding machines are commercially available from Arburg GmbH under the trade name ALLROUNDER. Horizontal injection moulding machines are widely available and may also be used. They provide an advantage in that the metal shaft may be positioned in the opposite mould half to the abrasive disc, both shaft and disc being held by interference fits in the mould halves prior to polymer injection.

It is not essential to use a metal shaft in the abrasive articles and in accordance with a further embodiment of the invention the shaft is integrally formed of the thermoplastic material with the hub. In this embodiment a mould plate may comprise a channel defining the shaft in communication with a moulding recess forming the hub. The abrasive disc, which may have a central recess, is positioned in the mould and the mould closed and molten thermoplastic material injected through the channel and recess into the centre of the disc thereby simultaneously forming the hub and the shaft.

The abrasive articles may comprise two or more abrasive discs mounted on a common shaft secured by the integrally formed hub. The abrasive discs may have the same or different abrasive grades and may have the same or different thickness. Adjacent discs may abut each other or adjacent discs may be spaced apart.

The present invention will now be described, by way of example only, with reference to the accompanying drawings.

DETAILED DESCRIPTION

Figure 1:
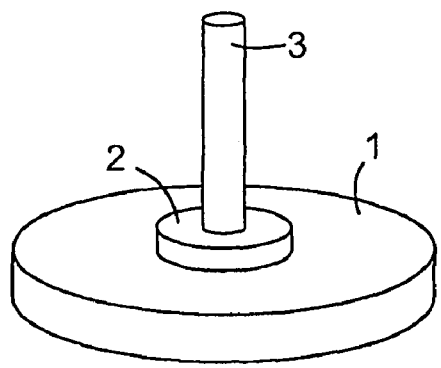
FIG. 1 is a perspective view of an abrasive article made according to the present invention.

The abrasive article shown in FIG. 1 comprises an abrasive disc 1, a hub 2 and a metal shaft 3. An end 4 of the shaft 3 is received in the hub 2 so as to mount the shaft 3 to the abrasive disc 1. The shaft 3 extends in a direction generally perpendicular to the plane of the disc. The abrasive disc 1 is made from an abrasive non-woven web material, the product commercially available from 3M Company under the trade name SCOTCH-BRITE Abrasive Disc. The hub 2 is made from injection moulded thermoplastic material.

Figure 2:
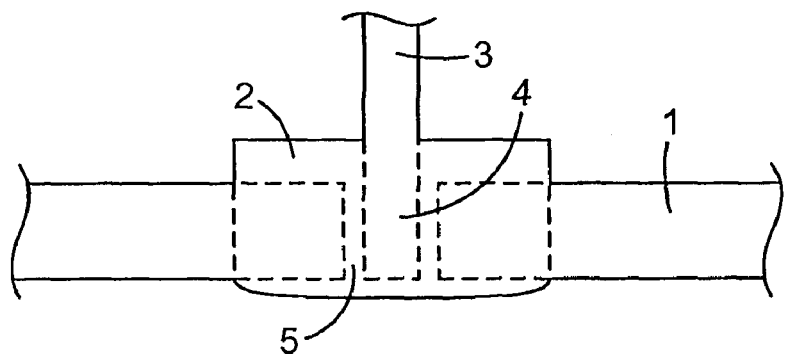
FIG. 2 is a partial cross-sectional view of the abrasive article shown in FIG. 1 on an enlarged scale.

An opening 5 is drilled or die-cut in the centre of the abrasive disc. The end 4 of the shaft 3 is located in this opening 5, as can be seen in FIG. 2. The hub 2 is located in the centre of the abrasive disc and the thermoplastic material fills the space in the opening 5 which is not occupied by the end of the shaft 4 to secure the shaft to the hub.

The connection between the abrasive disc 1 and the hub 2 is achieved as a result of the thermoplastic material penetrating the interstices 6 between fibres of the abrasive non-woven web material of the disc. During the injection moulding process, some of these interstices are filled with the plastics material as shown schematically at 7 in FIG. 3. In this way, the material of the hub 2 impregnates the central part of the abrasive disc 1 so that at least part of the hub is formed in the abrasive disc. The hub 2 extends through the full thickness of the abrasive disc 1. The end of the shaft is provided with a roughened or knurled surface 8 to enhance mechanical engagement between the shaft and the hub.

The hub 2 may be formed with indicia moulded therein to act as a label.

In an alternative embodiment (not shown), the abrasive disc is formed with a recess, for example by drilling, to receive the end of the shaft rather than an opening that extends all the way through the abrasive disc.

Figure 4:
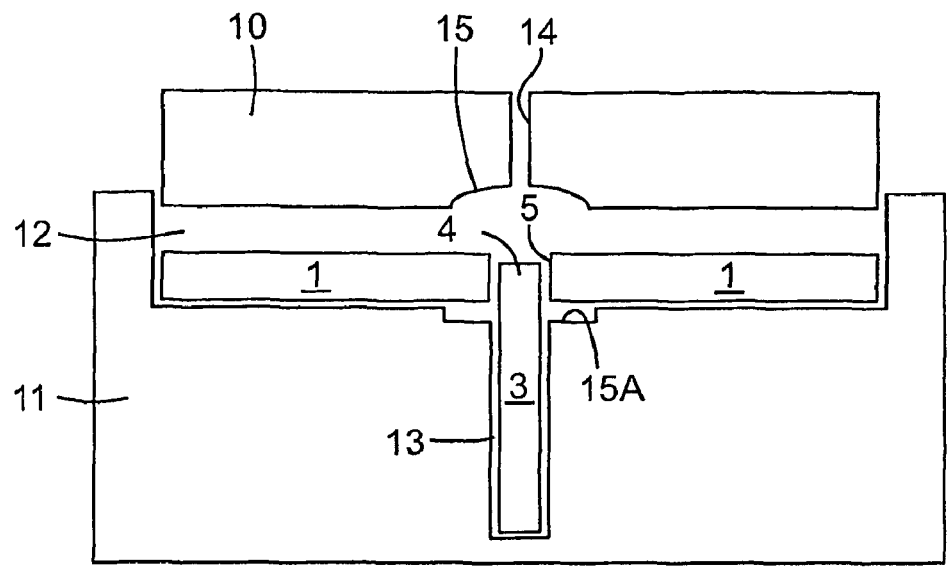
FIG. 4 is a cross-sectional view of a mould used to make the abrasive article shown in FIGS. 1 and 2.

The abrasive article is formed using the mould shown in FIG. 4. The mould comprises a first plate 10 and a second plate 11, which form a mould cavity 12. The second plate 11 has a bore 13 in which the shaft 3 is positioned. The length of the bore 13 is such that an end 4 of the shaft 3 protrudes into the mould cavity 12. The abrasive disc 1 is provided and a central portion is removed by die-cutting to form an opening 5. The abrasive disc 1 is then placed in the mould cavity 12 so that the end 4 of the shaft 23 is located in the opening 5 in the abrasive disc 1. The first 10 and second 11 plates are then closed. Slight compression of the abrasive disc in the mould cavity occurs as the mould is closed.

The first plate 10 is formed with a channel 14 through which plastic material is injected into the mould cavity 12. In the embodiment shown, the first 10 and second 11 plates are each formed with a recess 15, 15a in their centres which results in the finished hub 2 having portions which extend beyond the surface of the abrasive disc 1. In other embodiments, neither of the plates or only one plate is formed with a recess. Either or both plates 10, 11 may have a moulding surface formed with a series of recesses into which plastic material is injected to mould indicia into the hub to act as a label.

When the mould is closed around the shaft 3 and the abrasive disc 1, molten thermoplastic material is injected under pressure through the channel 14 and into recess 15. The thermoplastic material flows into the opening 5 in the abrasive disc and surrounds the shaft 3, and flows into the interstices 7 in the abrasive disc 1 in the region of the opening 5 and into recess 15a. The presence of recess 15 is advantageous since it provides a raised area for pressure concentration of the molten thermoplastic material forcing the material into the interstices of the abrasive disc without allowing undue radial spread of the thermoplastic material. The thermoplastic material is then allowed to cool and solidify. In this way, the shaft 3 is firmly secured in the hub 2 which itself is firmly anchored to the abrasive disc.

Figure 5:
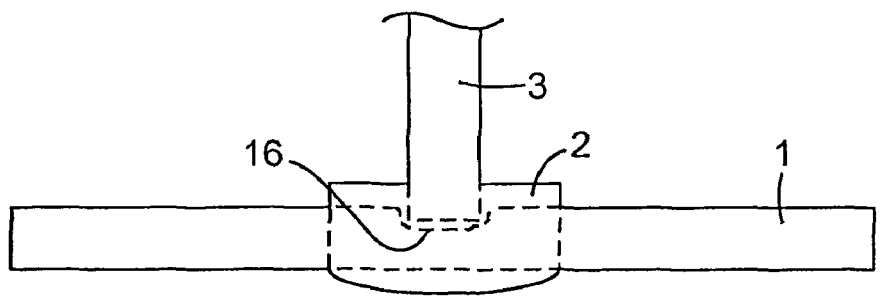
FIG. 5 is a cross-sectional view of a further abrasive article made according to the invention.

A second embodiment of the invention is shown in FIG. 5. Like components are referred to using like reference numerals. In this embodiment, the abrasive disc 1 is not die-cut to form an opening to receive the end of the shaft. Instead, the end of the shaft 4 is forced into the abrasive disc 1 material e.g. by the action of bringing the mould plates 10, 11 together. The end 4 of the shaft 3 is located in a recess 16 created in the abrasive disc 1 and the hub 2 connects the shaft 3 to the abrasive disc 1 as described above.

Figure 3:
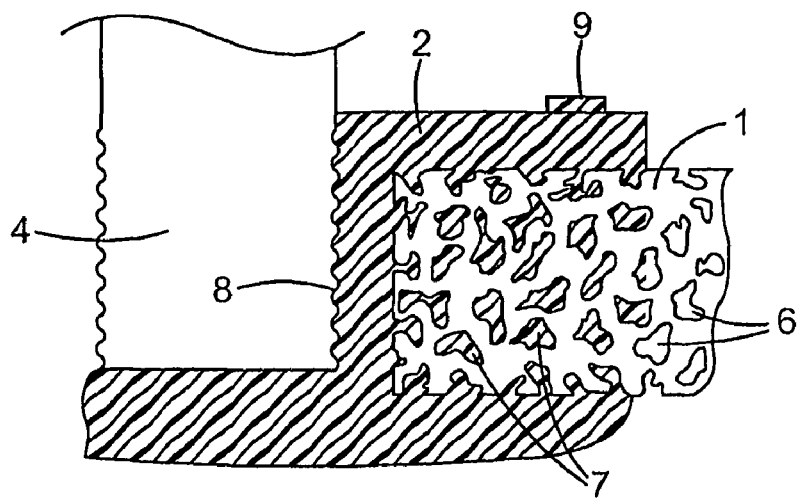
FIG. 3 is a schematic diagram showing an enlarged view of the connection between the abrasive disc and the hub.

The abrasive article shown in FIG. 5 is made in much the same way as that shown in FIGS. 1 to 3 using the mould shown in FIG. 4. However, the end 4 of the shaft protrudes into the mould cavity 12 to a lesser extent so that, when the mould plates 10, 11 are brought together, the end of the shaft does not penetrate through the entire thickness of the abrasive disc 1. As shown in FIG. 5, the shaft 3 penetrates less than half the thickness of the abrasive disc 1. However, the length of shaft may be selected to achieve the desired degree of penetration.

Figure 6:
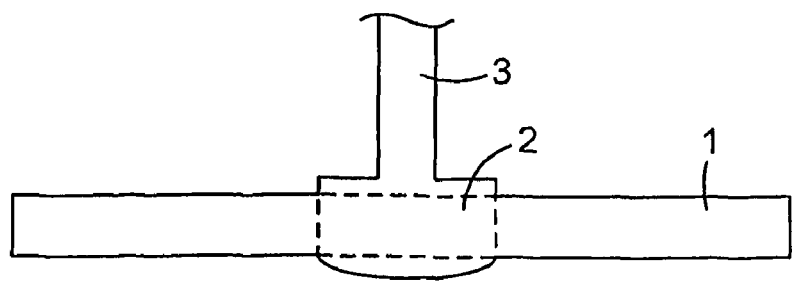
FIG. 6 is a cross-section view of a further abrasive article made according to the invention.

According to a further embodiment, the hub 2 and the shaft 3 are both formed from injection moulded thermoplastic material as illustrated in FIG. 6. As shown in this embodiment, the abrasive disc 1 does not have an opening or recess but an opening or recess may be present to aid penetration of the thermoplastic material into the interstices of the abrasive disc. The thermoplastic material forming the hub 2 impregnates the centre of the abrasive disc 1 and fills the interstices 6 in the central part of the abrasive disc. The shaft 3 is an integral extension of the hub 2, which extends generally perpendicularly away from the plane of the abrasive disc 1.

Figure 7:
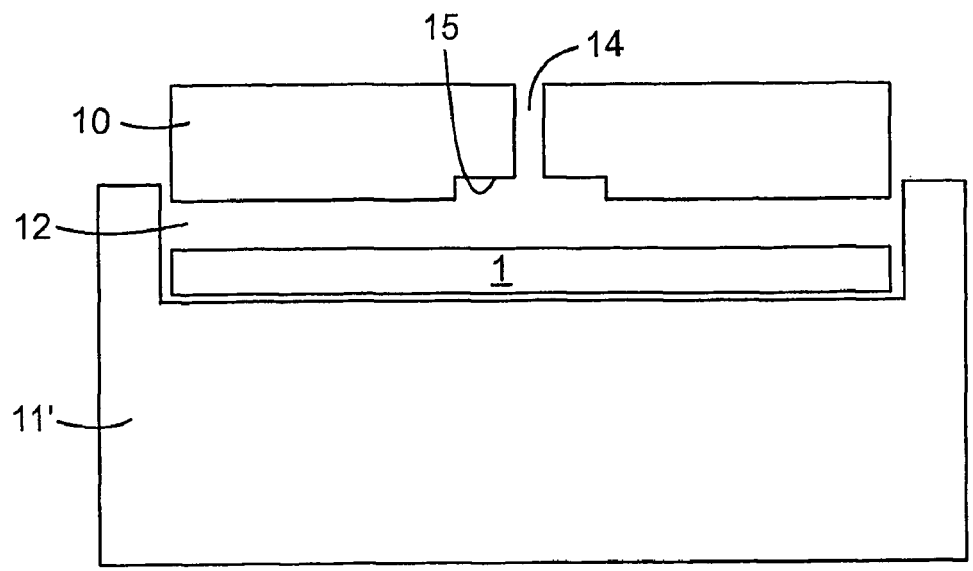
FIG. 7 is a cross-sectional view of a mould used to make an abrasive article shown in FIG. 6.

The abrasive article according to this embodiment may be formed using the mould shown in FIG. 7. This mould has a first plate 10 and a second plate 11' which form a mould cavity 12. The first plate 10 is formed with a channel 14 through which the thermoplastic material is injected into the recess 15 which results in the finished hub 2 extending beyond the surface of the abrasive disc 1. A recess could also be formed in the second plate 11', as described with respect to FIG. 4.

In use, the abrasive disc 1 is placed on the mould cavity 12 and the first 10 and second 11' plates are brought together to close the mould. Slight compression of the abrasive disc 1 may occur when the mould is closed. Molten thermoplastics material is then injected under pressure through the channel 14, into the recess 15 and to penetrate the abrasive disc 1 to form the hub 2. When the thermoplastic material has been injected into the mould cavity to form the hub, the plastic material is allowed to fill the channel 14 so as to form the shaft 3. The plastics material is then allowed to cool and solidify.

Figure 8:
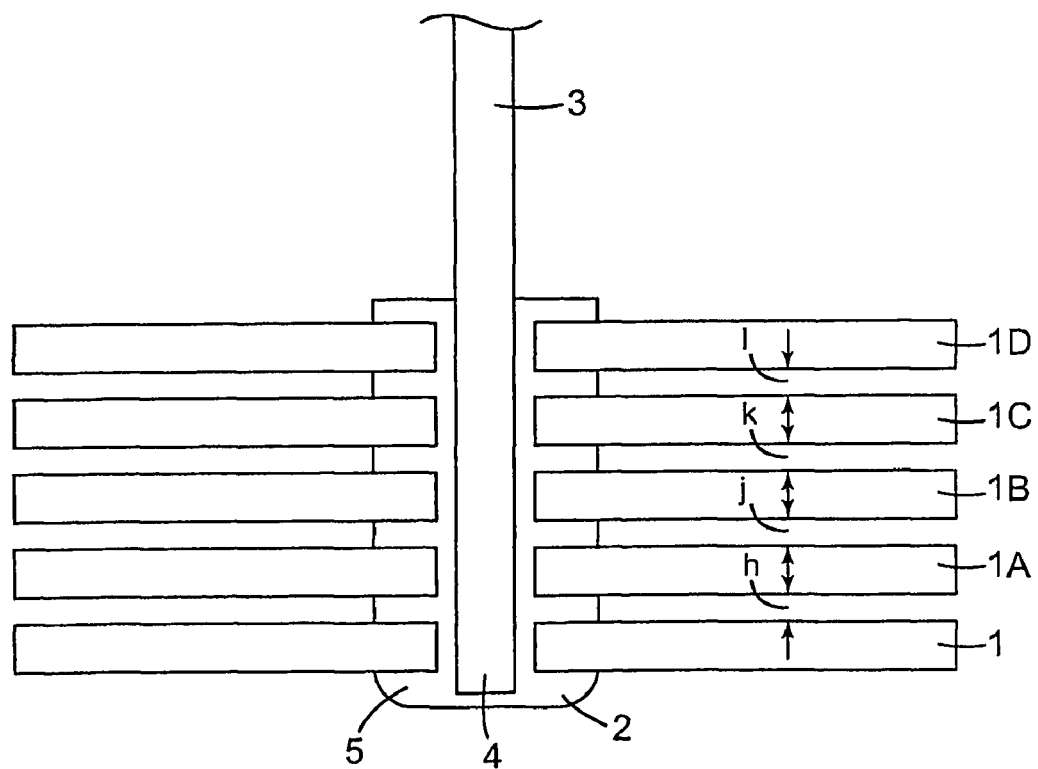
FIG. 8 is a cross-sectional view of a further abrasive article made according to the invention comprising a plurality of discs on a common shaft.

The abrasive article shown in FIG. 8 comprises a hub 2 and a metal shaft 3. Five abrasive discs 1, 1A, 1B, 1C, 1D are used to produce an abrasive article with multiple discs in one unit. The number of discs is typically 2 to 5, but could be larger. The discs can be of similar or different abrasive grades, in various sequences to produce different effects in use. The gaps between discs h, j, k, l could be zero or finite and the gaps may be the same or different to produce varying abrasive effects in use. A specially adapted mould cavity 12 is required to hold all these discs but, otherwise, the method of making the abrasive article is as described above.

Figure 9:
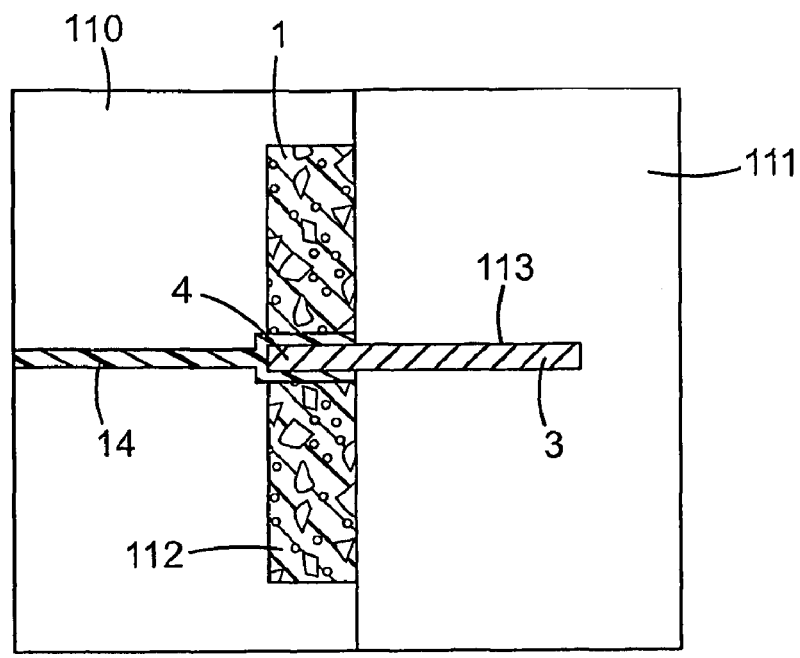
FIG. 9 is a cross-sectional view of a mould for a horizontal injection moulding machine used to make an abrasive article in accordance with the invention.

The mould of a horizontal injection moulding machine, which may also be used in a method in accordance with the invention, is represented in FIG. 9. The mould is shown at the plastic injection stage with the two mould halves closed. The mould comprises a first plate 110 and a second plate 111, which form a mould cavity 112. The second plate 111 has a bore 113 in which the shaft 3 is positioned. The length of the bore 113 is such that an end 4 of the shaft 3 protrudes into the mould cavity 112. The abrasive disc 1 is provided and a central portion is removed by die-cutting to form a hole. The abrasive disc 1 is then placed in the mould cavity 112. The first 110 and second 111 plates are then closed. Slight compression of the abrasive disc in the mould cavity occurs as the mould is closed.

The first plate 110 is formed with a channel 14 through which molten thermoplastic material is injected into the mould cavity 112 filling the hole in the centre of the abrasive disc and penetrating the surrounding abrasive material to a depth of several millimeters. Thus, the shaft is surrounded by thermoplastic material in the hole in the abrasive disc.

Figure 10:
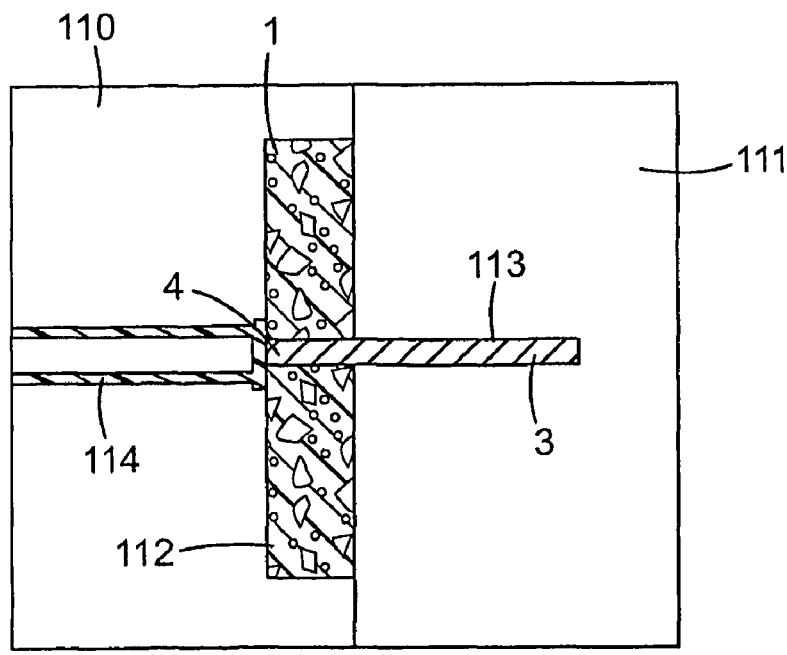
FIG. 10 is a cross-sectional view of a further mould for a horizontal injection moulding machine used to make an abrasive article in accordance with the invention.

An alternative mould arrangement for horizontal injection moulding is shown in FIG. 10. The abrasive disc 1 has no central portion removed by die-cutting. The force of mould closure causes the shaft 3 to penetrate the web 112. The first plate 110 is formed with an annular channel 114 through which molten thermoplastic material is injected to surround the shaft 3 and penetrate the adjacent abrasive material. In this case there will be fibres of the abrasive disc touching the shaft which are impregnated with the thermoplastic material.

In the Examples that follow, a vertical orientation injection moulding machine model was used commercially available from Arburg GmbH & Co. KG, Arthur-Hehl-Str., 72290 Lossburg, Germany under the trade name ALLROUNDER 270-90-500.

Machine #270-90-500 has a Clamping Force of 500 kN maximum, a Mold Opening Stroke of 325 mm max., a Mold Height of 225 mm minimum a Daylight maximum of 550 mm, an Ejector Force of 31.4 kN max., an Ejector Stroke of 125 mm max. In these examples the Injection Unit had the following features: Screw Diameter of 25 mm, Screw Length of 18 L/D, Screw Stroke of 100 mm max., Swept Volume of 49 cc max., Shot Capacity of 41 g max., Injection Pressure of 1860 bar max., Injection Flow of 98 cc/s max., Screw Rotation Speed of 725 rpm max., Screw Circumferential Speed of 57 m/minute max., Screw Torque of 290 Nm max.

The following process conditions were used, except where noted:
Heating Zone Temperatures:
Zone 1: 225° C. for HYTREL 6356; 200° C. for HOSTALEN GN8255; 260° C. for LATAMID Polyamide.

Zone 2: 240° C. for HYTREL 6356; 210° C. for HOSTALEN GN8255; 265° C. for LATAMID Polyamide.
Zone 3: 245° C. for HYTREL 6356; 235° C. for HOSTALEN GN8255; 275° C. for LATAMID Polyamide.
Nozzle: 250° C. for HYTREL 6356; 245° C. for HOSTALEN GN8255; 280°, Mould 80° C. for LATAMID Polyamide.
Injection Flow: 39 cc/s; Injection Time: 1.4 seconds;
Injection Pressure: 25% of maximum for HYTREL 6356; 25% of maximum for HOSTALEN GN8255; 15% of maximum for LATAMID Polyamide.

Where indicated the thermoplastic material was treated in a desiccator prior to injection moulding. The desiccator used was commercially available from Digicolor Gesellschaft fuer Kunstoffmaschinentechnik mbH, Eckendorfer Strasse 125a, 33609, Bielefeld, Germany under the trade name Trockenlufttrockner Digicolor KTT 100. The following process conditions were used, except where noted: Time: minimum 2 hours;
Temperature: 80° C. for HYTREL 6356 and LATAMID Polyamide.

The metallic shaft used in the Examples was a steel shaft commercially available from Wieland-Werke AG, Graf-Arco-Strasse 36, 89079 Ulm, Germany having the following properties:
Length: 50 mm—diameter 6 mm—post treatment: nickel plated
End of shaft knurled: length knurled: 10 mm
Knurl depth: minimum 0.2 mm The mould used was as illustrated in FIG. 4 without recess 15a.

EXAMPLES 1 AND 2

The abrasive disc was a non-woven abrasive web made according to U.S. Pat. No. 4,227,350 with a polyarnide 6 fibre diameter of 0.38 mm, 36 grit silicon carbide mineral, a weight of 4.2 kg per sq.m., and a thickness of 13 mm.
Disc dimension: 100 mm outer diameter (OD); 13 mm thickness; −28 mm inner diameter (ID) (centre hole)

The thermoplastic material used in Example 1 was commercially available from DuPont under the trade name HYTREL 6356 and the thermoplastic material used in Example 2 was commercially available from Basell Polyolefine GmbH under the trade name HOSTALEN GN8255 polyethylene.

EXAMPLE 1

10 grams HYTEL 6356 injected.
Migration of polymer through the web for at least 1 to 2 mm. No migration of the polymer to a large distance (less than 30 mm from the centre). Good grip between the non-woven abrasive web and the polymer.

EXAMPLE 2

10 grams HOSTALEN GN8255 injected. Migration of polymer through the non-woven abrasive web for at least 1 to 2 mm. No migration of the polymer to a large distance (less than 30 mm from the centre). Good grip between the non-woven abrasive web and the polymer. Bonding between shaft and polymer not as good as Example 1.

EXAMPLES 3 AND 4

The abrasive disc was from a non-woven abrasive web made according to U.S. Pat. No. 4,227,350 with a polyamide 5 fibre diameter of 0.38 mm, 36 grit silicon carbide mineral, a weight of 4.2 kg per sq.m., and a thickness of 13 mm.
Disc dimensions: 100 mm OD; 13 mm, thickness; 13 mm ID (center hole).

The thermoplastic material used in Example 3 was LATAMID 66, a polyamide 6, 6 polymer and the thermoplastic material used in Example 4 was LATAMID 66 H2G30, a polyamide 6, 6 polymer filled with 30% by weight glass fibre respectively, both materials commercially available from LATI Industria Termoplastici S.p.A.

EXAMPLE 3

Polymer preparation: desiccation for 5 hours at 80° C.
Mass of LATAMID 66 injected: 12 grams.
Migration of polymer through non-woven abrasive web of at least 1 to 2 mm. No migration of the polymer to a large distance (less than 30 mm from the centre) Good grip between the non-woven abrasive web and the polymer. Very good bonding between shaft and polymer.

EXAMPLE 4

Polymer preparation: desiccation for 5 hours at 80° C.
Mass of LATAMID 66 H2 G30 injected: 12 grams.
Migration of polymer through the non-woven abrasive web of at least 1 to 2 mm. No migration of the polymer to a large distance (less than 30 mm from the centre). Good grip between the non-woven abrasive web and the polymer. Very good bonding between shaft and polymer.

EXAMPLE 5

The abrasive disc was from a non-woven abrasive web made according to U.S. Pat. No. 6,302,930 with a polyamide 6 fibre diameter of 0.43 mm, 36 grit silicon carbide mineral, a weight of 4.7 kg per sq. m., and a thickness of 13 mm.
Disc dimensions: 100 mm OD; 13 mm thickness, with 13 mm ID (center hole).
The thermoplastic material was LATAMID 66 H2 G30.
Polymer preparations: desiccation for 5 hours at 80° C.
Mass of Latamix 66 H2 G30 injected: 12 grams
Observations:
Migration of polymer through the non-woven abrasive web of at least 1 to 2 mm. No migration of the polymer to a large distance (less than 30 mm from the centre). Good grip between the non-woven abrasive web and the polymer. Good bonding between shaft and polymer.

EXAMPLE 6

The abrasive disc used was commercially available from 3M Company under the trade name 3M ROLOC HI-PERFORMANCE CLEAN 'N STRIP Abrasive Disc H1-DC". The disc is described as a "foam injected web", comprising a non-woven abrasive web with foam injected into the web thereby filling the interstices between the fibres.
The thermoplastic material was LATAMID 66
Polymer preparation: desiccation for 5 hours at 80° C.
Mass of LATAMID 66 injected: 12 grams.
Migration of polymer through the foam injected non-woven abrasive web of at least 1 to 2 mm. No migration of the polymer to a large distance (less than 30 mm from the centre). Good grip between the non-woven abrasive web and the polymer. Very good bonding between the shaft and polymer.

The invention claimed is:

1. A method of making an abrasive article comprising an abrasive disc formed of non-woven fibres, a metal shaft positioned at the centre of the abrasive disc and a hub securing an end of the metal shaft to the abrasive disc, the method comprising the steps of:
   providing a mould having first and second mould plates which together define a mould cavity dimensioned to accommodate the abrasive disc, the second mould plate having a bore formed therein to accommodate the metal shaft so that one end thereof projects into the mould cavity and a recess in the moulding surface of the second mould plate around the bore and the first mould plate having a channel for injection of molten thermoplastic material into the mould cavity, the channel positioned opposite the end of the metal shaft and the channel opening into a central recess in a moulding surface of the first mould plate positioned above the end of the metal shaft;
   placing the metal shaft into the bore;
   placing the abrasive article into the mould cavity;
   closing the mould;
   forming the hub by injecting molten thermoplastic material into the abrasive disc through the channel; and
   allowing the thermoplastic material to cool and solidify such that the metal shaft is bonded to the hub and the hub is anchored to the abrasive disc.

2. A method as claimed in claim 1 in which the end of the metal shaft secured to the hub is roughened or knurled.

3. A method as claimed in claim 1 in which the abrasive article comprises a plurality of discs mounted on said shaft.

4. A method as claimed in claim 1 in which the abrasive disc is provided with a central aperture to accommodate the end of the shaft.

5. A method as claimed in claim 1 in which the metal shaft is positioned such that the end extends partially or completely through the thickness of the abrasive disc.

6. A method as claimed in claim 1 in which the thermoplastic material is selected from polyamides, polyolefines, and polyether ester elastomer block copolymers.

7. A method as claimed in claim 6 in which the thermoplastic material contains filler and/or reinforcing fibres.

8. A method as claimed in claim 6 in which the thermoplastic material is injected at a temperature in the range 200 to 280° C.

9. A method as claimed in claim 6 in which the thermoplastic material contracts slightly when cooled.

10. A method as claimed in claim 1 in which the abrasive disc comprises thermoplastic material filling interstices between the non-woven fibres.

11. A method as claimed in claim 1 in which the abrasive disc is compressed in the mould cavity when the mould is closed.

* * * * *

UNITED STATES PATENT AND TRADEMARK OFFICE
CERTIFICATE OF CORRECTION

PATENT NO.         : 8,137,423 B2
APPLICATION NO.    : 11/573460
DATED              : March 20, 2012
INVENTOR(S)        : Jonathan Mark Lise It is certified that error appears in the above-identified patent and that said Letters Patent is hereby corrected as shown below:

Column 2
Line 52, delete "the." and insert -- the --, therefor.

Column 3
Line 23, delete "polymether" and insert -- polyether --, therefor.
Line 26, delete "Termoplastic" and insert -- Termoplastici --, therefor.

Column 7
Line 14, delete "Kunstoffmaschinentechnik" and insert
      -- Kunststoffmaschinentechnik --, therefor.
Line 35, delete "polyarnide" and insert -- polyamide --, therefor.
Line 39, delete "hole)" and insert -- hole). --, therefor.

Column 10
Line 12, in Claim 6, delete "polyolefines," and insert -- polyolefins, --, therefor.

Signed and Sealed this
Fifth Day of June, 2012

David J. Kappos
*Director of the United States Patent and Trademark Office*